(12) United States Patent
Fogg et al.

(10) Patent No.: US 8,458,152 B2
(45) Date of Patent: Jun. 4, 2013

(54) SYSTEM AND METHOD FOR PROVIDING HIGHLY READABLE TEXT ON SMALL MOBILE DEVICES

(75) Inventors: Brian J. Fogg, Stanford, CA (US); Gregory S. Cuellar, Palo Alto, CA (US); Dean Eckles, Stanford, CA (US)

(73) Assignee: The Board of Trustees of the Leland Stanford Jr. University, Palo Alto, CA (US)

( * ) Notice: Subject to any disclaimer, the term of this patent is extended or adjusted under 35 U.S.C. 154(b) by 1963 days.

(21) Appl. No.: 11/267,028

(22) Filed: Nov. 4, 2005

(65) Prior Publication Data

US 2006/0100984 A1    May 11, 2006

Related U.S. Application Data

(60) Provisional application No. 60/625,493, filed on Nov. 5, 2004.

(51) Int. Cl.
*G06F 17/30*      (2006.01)

(52) U.S. Cl.
USPC .......................................... 707/705; 715/273

(58) Field of Classification Search
USPC .................. 707/1, 2, 705; 715/273
See application file for complete search history.

(56) References Cited

U.S. PATENT DOCUMENTS

| | | | |
|---|---|---|---|
| 2002/0133521 A1* | 9/2002 | Campbell et al. | 707/526 |
| 2003/0004979 A1* | 1/2003 | Woodring | 707/203 |
| 2003/0018646 A1* | 1/2003 | Ohta et al. | 707/100 |
| 2004/0119684 A1* | 6/2004 | Back et al. | 345/156 |

* cited by examiner

*Primary Examiner* — James Trujillo
*Assistant Examiner* — Amresh Singh
(74) *Attorney, Agent, or Firm* — Wong, Cabello, Lutsch, Rutherford & Brucculeri, LLP

(57) ABSTRACT

A system which includes a cell phone or other mobile device which uses RSVP (rapid serial visual presentation) to present text information. The mobile device software receives the textual material to be displayed in a mark-up language, preferably XML. The markup language is used to provide information about the actual content being displayed to indicate certain features using enhanced RSVP techniques. To provide these marked-up language files to the mobile device, a backend system is utilized. The backend system receives the files to be read and parses them to provide the markup language based on the desired changes to be used by the advanced RSVP display of the mobile device. The marked up file can be forwarded on a routine basis or can be requested by the user. The mobile device receives the marked up file and displays the material in the enhanced RSVP methods according to the commands.

42 Claims, 4 Drawing Sheets

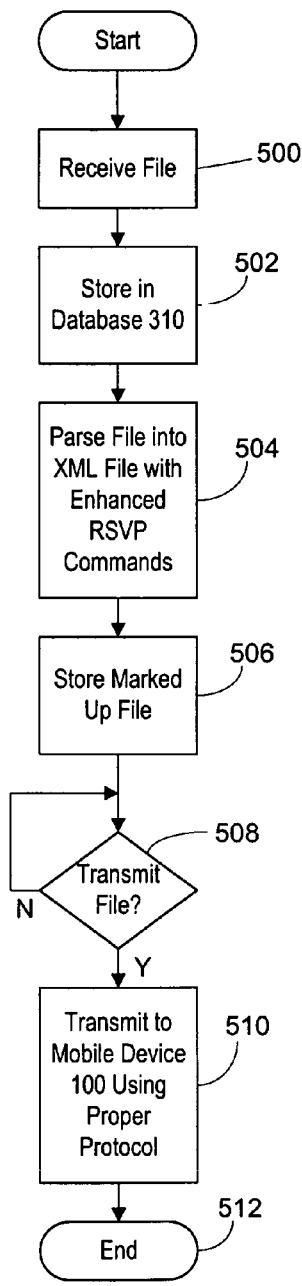
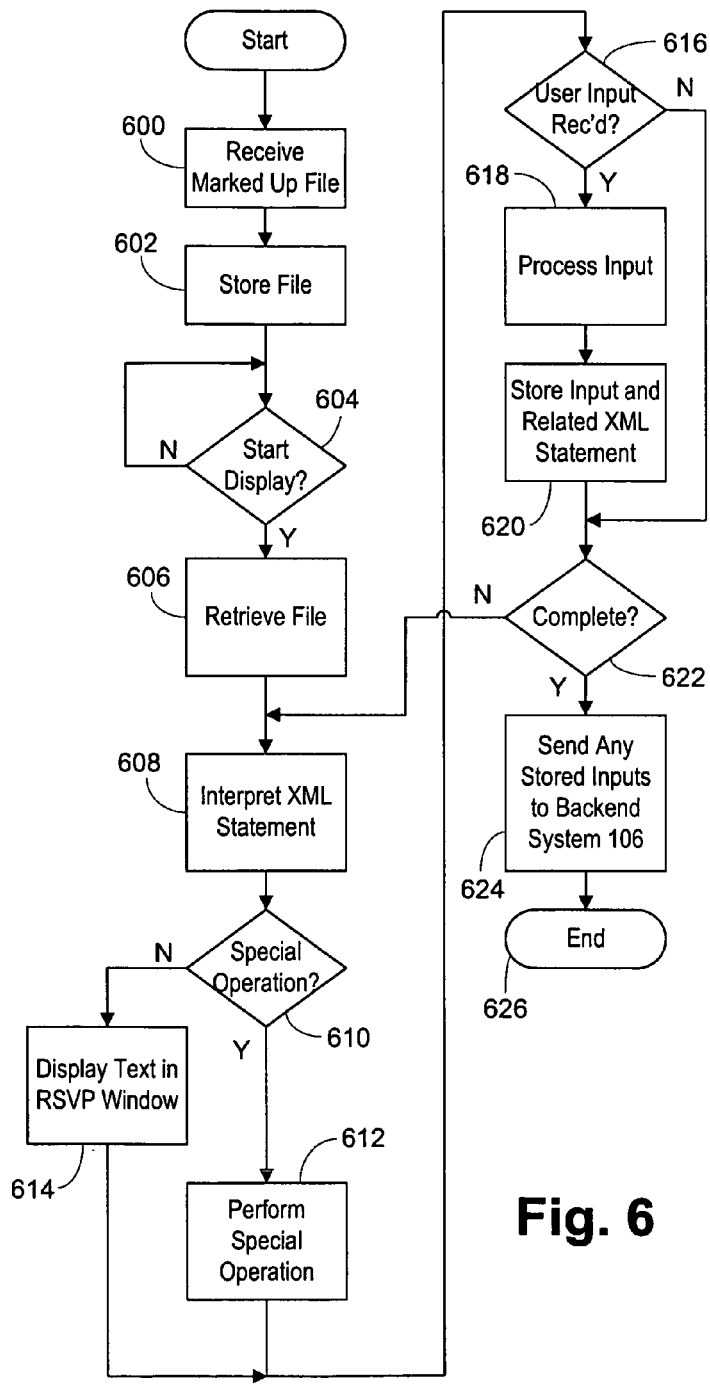
Fig. 5
Fig. 6

SYSTEM AND METHOD FOR PROVIDING HIGHLY READABLE TEXT ON SMALL MOBILE DEVICES

CROSS REFERENCE TO RELATED APPLICATIONS

This application claims the benefit under 35 U.S.C. §119 (e) of U.S. Provisional Patent Application Ser. No. 60/625,493, entitled "System and Method for Providing Highly Readable Text on Small Mobile Devices" by Brian J. Fogg, Gregory S. Cuellar, and Dean Eckles, filed Nov. 5, 2004, which is hereby incorporated by reference.

BACKGROUND OF THE INVENTION

1. Field of the Invention

The invention generally relates to devices and techniques for displaying text for reading by a user.

2. Description of the Related Art

Mobile devices are becoming ever more common. Mobile phones and smart devices, such as PDAs, and even pagers and watches, that have wireless connectivity are becoming mandatory parts of our mobile society. One of the commonalities of these devices is that they have small displays used for the user interface. Given that many users want to see various text items, such as news feeds or books, on their mobile devices, a way to easily and simply read the various texts is desired. Because the screens are small, this complicates and effectively eliminates many conventional types of reading and the text presentations as would be done on a conventional large monitor or television type device. So an improvement is needed to help provide better text capabilities to the small mobile devices.

One technique that has been used in the past on various small display devices has been rapid serial visual presentation (RSVP). The basic concept of RSVP is that one word at a time is presented in a fixed location, but presented very quickly. A human is able to detect these rapid changes of the words and fully process the text. To date most uses of RSVP have been for speed reading and research, with only limited commercial applications. A few handheld systems, such as PDAs, have implemented RSVP but in very simple manners. The most capability that they had was buttons to slow down or speed up the display of the words. While this technique on a handheld is an advance over presenting the normal text type messages, it still has perception problems should the user blink. Additionally, contextual issues arise because of the presentation of only one word at a time. It would be desirable to be able to provide tools to provide better comprehension of the particular words or text being displayed in the RSVP window to improve the overall performance and capabilities of display devices, particularly the small mobile devices.

SUMMARY OF THE INVENTION

A system according to the present invention includes a cell phone or other mobile device which uses RSVP to present various text information. The text information can be news feeds or other materials as desired. The mobile device software receives the textual material to be displayed in a markup language, preferably XML. The markup language is used to provide information about the actual content being displayed. For example, the XML could indicate that a number is being displayed. The mobile device software would then interpret this XML to understand that a number is to be displayed next and slow down the display rate to allow better comprehension and retention by the user. Alternatively, the XML could indicate that a parenthetical phrase is beginning and the mobile device software could interpret this and provide an icon or special character which is present through a multiple string of words to indicate that a parenthetical phrase is being read. Other examples will be described in the Detailed Description.

To provide these marked-up language files to the mobile device, a backend system is utilized. Preferably the backend system receives the various news feeds, such as RSS feeds, or documents particularly selected by the desired user. The backend system then parses these text files and provides the markup language based on the desired changes or other information to be used by the advanced RSVP display of the mobile device. The backend system then stores this mark-up language file for transmission to the mobile device as desired. It can be forwarded on a routine basis; can be requested by the user; or can be triggered by an event, context or location, as examples.

The user may have software on a personal computer to connect to the backend system set up various options, such as a cell phone number and so on, to provide the information from the backend system to a cell phone; to indicate which news feeds are to be gathered; which particular items to the backend system for individual content and so on. Alternatively, a browser on the mobile phone can be used to connect to the backend system. In certain embodiments the user personal computer and the backend system can be on the same computer. In other embodiments the mobile device can function as the user personal computer.

In various enhancements, the system can learn from various interactions from the user, such as when the user slows down or speeds up or pauses operation for better comprehension. These interaction events can be noted by the mobile device and provided to the backend system to provide further tailoring and inclusion of markup language parameters to improve the content and experience for the particular user.

An additional enhancement is that the text parser can provide markup language indications to be used by the mobile device software that causes the delivered text information to be manipulated graphically, along the lines of dynamic typography. In a further embodiment, an audio track can be provided synchronized with the text to further improve RSVP comprehension.

BRIEF DESCRIPTION OF THE FIGURES

FIG. 5 is a flowchart of operations in the backend system according to the present invention.

FIG. 6 is a flowchart of operations in the mobile device according to the present invention.

DETAILED DESCRIPTION OF THE PREFERRED EMBODIMENT

Figure 1:
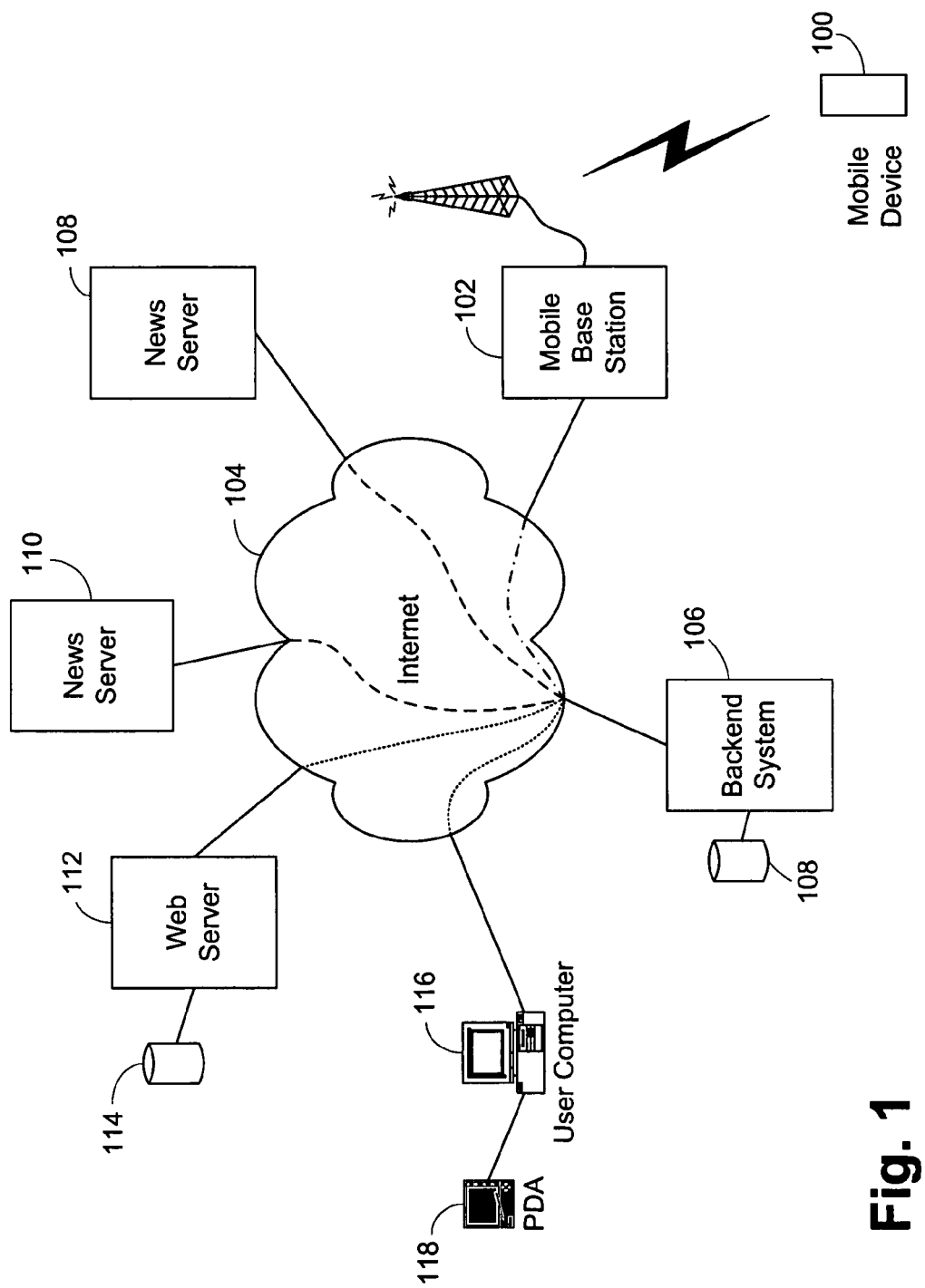
FIG. 1 is a block diagram of a system according to the present invention.

A mobile device 100 is connected over a wireless link to a mobile base station 102. This mobile base station 102 is connected through the Internet 104 to a backend system 106.

Preferably the communication between the backend system 106 and the mobile base station 104 is done in the form of e-mail, but other text messaging techniques can be utilized. The backend system 106 preferably includes a database 108 to manage operations. The backend system 106 is further connected through the Internet 104 to news servers 108 and 110. Preferably the news servers 108 and 110 provide RSS feeds, but other techniques can be utilized if desired. A web server 112, with its associated storage 114, is also connected through the Internet 104 to the backend system 106. Finally, a user computer 116 and a connected PDA 118 are connected through the Internet 104 to the backend system 106. The user computer 116 can directly transfer files using standard IP protocols from the user computer 116 to the backend system 106 or through software running on the backend system 106, such as through a web server, can request and transfer files from the web server 112. Alternatively, the backend system 106 can provide the information to the user computer 116, which can locally store it on the PDA 118.

In operation, the new servers 108 and 110 provide news feeds to the backend system 106 and data files, preferably text files, are provided from the user computer 116 and the web server 112 to the backend system 106.

Figure 2:
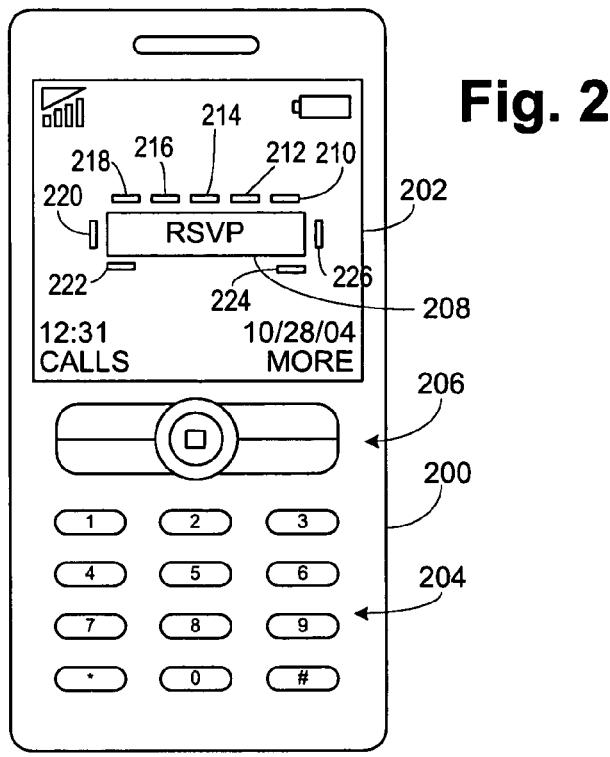
FIG. 2 is a drawing of a exemplary cell phone showing the RSVP window and various other elements according to the present invention.

FIG. 2 illustrates an exemplary cell phone 200 as the mobile device 100. The cell phone 200 includes a display area 202, a keypad area 204 and control buttons 206, with a control button potentially including a pointing device. In addition to the normal display areas for cell phone activity, such as the various menus in the corners, the day and date, signal strength and the battery capacity as shown in the display 202, an RSVP area 208 is provided. This is the area where the RSVP text is provided. Adjacent the RSVP area 208 are a series of icons or character areas 210-212. These icons or special text areas 210-226 can be used to provide specific information to improve the comprehension of the text being displayed in the RSVP window 208. Preferably the display area 202 uses a color display so that color attributes can also be used to provide information content.

Figure 3:
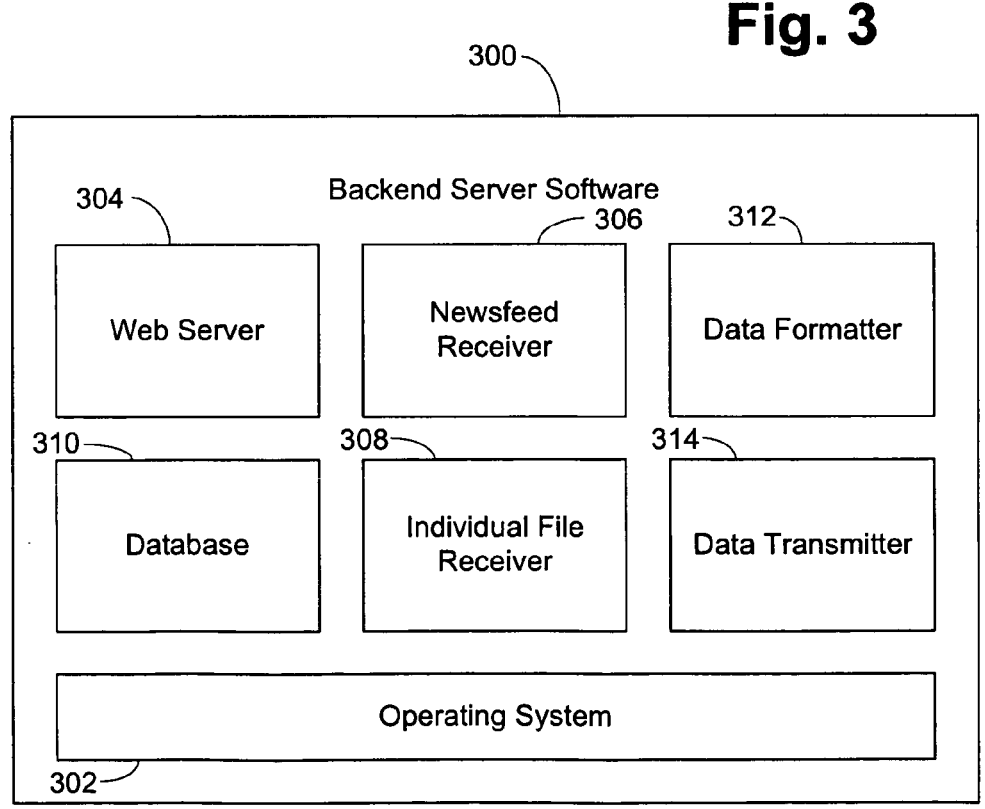
FIG. 3 is a block diagram of the software modules running on the backend system according to the present invention.

FIG. 3 is the block diagram on the software 300 running on the backend system 106. The various modules include an operating system 302, which can be any of the preferred operating systems; a web server 304 to provide an interface to a user computer such as user computer 116 or to the mobile device 100 to personalize the system or to provide management operations; a news feed receiver module 306 to interact with the news servers 108 and 110; and an individual file receiver module 308 to interact with the Web server 112 and the user computer 116 to receive individual text files indicated by the user. All of the information received by the receivers 306 and 308 is contained in a database 310. A data formatter module 312 formats the received raw text information into a mark-up language, preferably XML, which contains various markers or indicators as necessary to provide the improved RSVP functions to be described. The database 310 contains either contained mark-up or unmarked-up files or a combination of both. When a marked-up file is to be transmitted to the mobile base station 102 or to the user computer 116, a data transmitter block 314 collects the file from the database 310 and transmits it to the base station 102 for transmission to the mobile device 100 or to the user computer 116.

Figure 4:
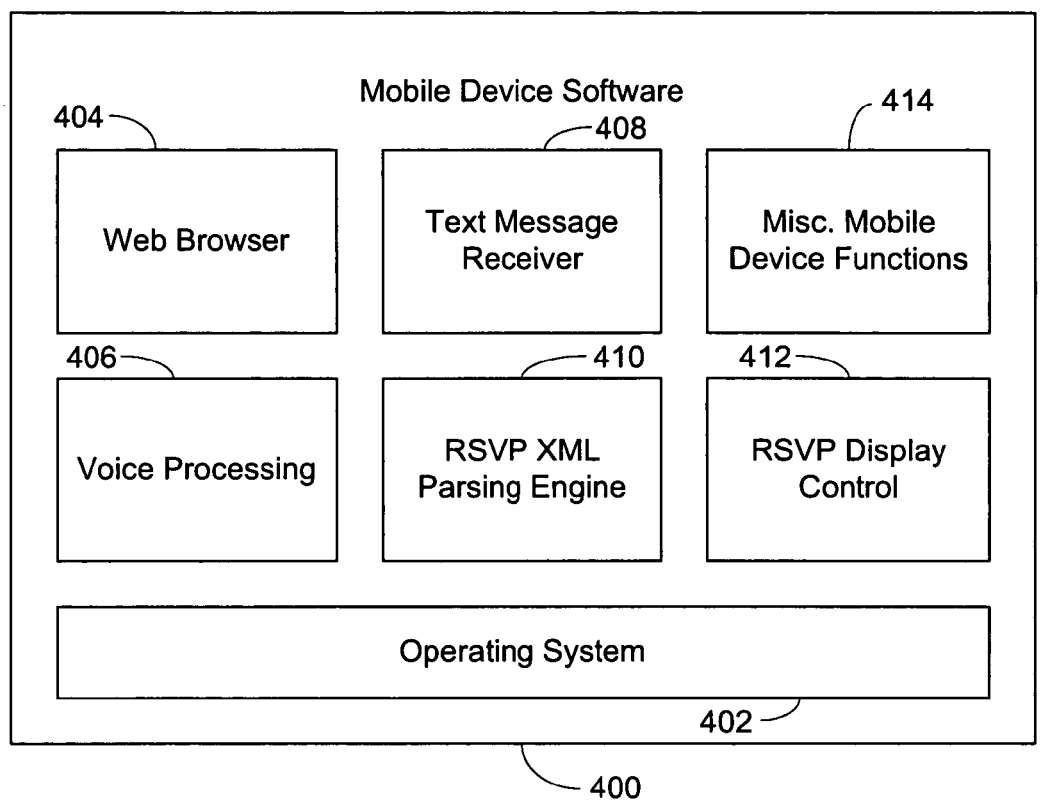
FIG. 4 is a block diagram of the software running on the mobile device according to the present invention.

FIG. 4 is a block diagram of software 400 executing on the mobile device 100. An operating system 402 is, of course, present, as is a web browser 404, as in most cases these are more advanced mobile devices with web browsing capability, with one use of the web browser being to interface with the backend system 106 instead of the user computer 116. Because many of these are mobile phones, a voice processing module 406 is present. A text message receiver module 408 receives the marked-up files being provided from the mobile base station 102 or from the user computer 116 if the mobile device 100 is the PDA 118. These received files, when appropriate, are provided to an RSVP XML parsing engine 410, which interprets the XML tags or mark-up language information embedded by the data formatter 312 in the backend system 106. The parsed file is then transmitted to an RSVP display control module 412, which takes the proper actions, such as slowing down or speeding up the textual display or activating the special characters or icons. The RSVP display control module 412 also interacts with the various control buttons 206 to receive user inputs relating to the RSVP operations. Finally, a module 414 is present to perform the other miscellaneous mobile device functions necessary.

Referring now to FIG. 5, a simple flowchart for the backend system 106 is shown. At step 500 the backend system 106 receives the file to be marked up. In step 502 the backend system 106 stores the file in database 310. In step 504 the backend system 106 parses the text file into an XML file with enhanced RSVP commands. The marked-up file is stored in step 506. In step 508 a loop is performed until it is time to transmit the file. Alternatively, instead of a time period, a user request or triggering by an event, context or location could be used to determine that a marked up file is to be transmitted. In step 510 the marked-up file is transmitted to the mobile device 100 using the proper protocol appropriate for the particular device, be it a wireless device or a PDA connected to a computer. This sequence completes at step 512. It is understood that this is a very simple flowchart and in normal practice this would be done as a series of multitasking operations in the backend system 106.

Numerous operations occur in step 504 where the file is parsed into the XML file with enhanced RSVP commands. A number of enhancements are known today and more may be developed in the future. An exemplary list of RSVP enhancements follow. For example, if a punctuation mark occurs or a paragraph end is reached, an XML command to indicate a longer pause before the next word can be inserted in the file. Preferably the punctuation marks are also included in the enhanced marked-up file by providing particular enhanced punctuation commands to allow their display by the mobile device 100 with any desired timing changes or special character display. Preferably, the data formatter 312 provides pause commands after common punctuation marks such as commas, periods, and semi-colons, which are normally done during textual reading operations. Preferably, any of the speed changes or pauses described are done as percentages to the base rate being utilized by the particular user to allow greater flexibility. As another example, if the received word is longer than a given limit, then a pause or a slow-down command can be inserted into the XML file to improve comprehension. Alternatively, for longer words, if desired, the beginning and end of the word can be clipped off and only the shortened form is displayed; compression can be done by removing the vowels and double consonants; or a smaller font can be used by the inclusion of a smaller font command and then a restore font command after the word. Indication of the desired method can be included in the marked-up file or an indication of the long word can be provided and the mobile device 100 can select the method. Hyphenation can be utilized as well for longer words, and all of these long word variations are in addition to the pausing. Should short words be present in a series, an XML command can be inserted to indicate that multiple words are to be displayed at one time.

As appropriate, formatting commands can also be provided as enhanced RSVP commands, such as bolding, italicizing, underlining and so on. If a quotation is started, several options are available, but in all cases the beginning of a quoted sentence would be noted by an enhanced RSVP command provided in the XML file, as would the end of the quotation. The actual mobile device can change colors, could display a special symbol, and so on, as desired for the particular user. Parenthetical expressions can be handled in the same manner. If a list of items is provided as indicated in the text file, particular enhanced commands can be inserted to provide numbers or bullet points for the particular information. Additionally, indentation commands can be provided to increase the readability and contextual information provided on the mobile device 100. If desired, special commands can be provided, such as paragraph markers for a new paragraph, symbols to indicate an image is to be located here, commands to indicate that sound files are to be included here, and so on. The special commands would be appropriately converted and interpreted in the mobile device 100.

If the included text document includes hypertext links, then XML commands can be included to provide the link, which then can be displayed at the bottom of the screen on the mobile device 100 for some period of time. The link is selected by particular control buttons or keys 206. Alternatively, the mobile device 100 can display the links if the playback is paused at that location, with a special symbol provided by a command being displayed on the display 202 during the period the text related to the hyperlink is being displayed Enhanced RSVP commands can be provided for table reading, such that the commands indicate the column number of the particular text, so that the multiple columns, preferably two given the narrow format of the display, can be shown in the RSVP window 200 as appropriate. An enhanced command can be used to provide an embedded image, in which case the image file is then linked in. The command thus indicates the actual length of the image file to allow the mobile device 100 to properly begin parsing the marked-up file again.

If stock ticker information, for example, is being provided, symbols or commands can be included in the XML string to both provide the symbol and the price on the screen at the same time. Color coding information can be selected to indicate whether the price is rising or falling, and potentially a color spectrum can be used to indicate the extent of change. If a heading is encountered in the text string, a command can be provided to allow the mobile device 100 to slow down to allow reading of the heading or, in the alternative, to display the header across the top of the screen during the block of text. In another alternative, the command could indicate that the heading is to be scrolled across the RSVP window 208, instead of being flashed as normal. If a particular introductory phrase is provided, such as "by the way" or "in other words," this can be done as a special command to show the phrase together. If a change in pattern is done, such as by use of the words: "but," "however," or "regardless," a command can be provided to slow down the RSVP display to allow better comprehension. RSVP commands can be included to indicate that a number is coming to allow a speed decrease, as well as the first use of a proper name, with both portions of the proper name displayed the first time as well and separately thereafter. Second and further uses of the proper name would not necessarily receive the slow-down command as the user would now be familiar with that particular name.

FIG. 6 illustrates a simple flowchart of the operation of the mobile device 100. Operation begins at step 600 where the marked-up file is received. Preferably this file is stored in step 602. In step 604 it is determined whether it is time to start displaying the file. When it is time to begin displaying the file, the file is retrieved in step 606 and the XML statement is interpreted in step 608. In step 610 it is determined whether this is a special enhanced special operation, such as one of the enhanced RSVP commands described above with respect to the parsing operations. If so, in step 612 the special operation is performed. These would be the operations appropriate for the commands described above, such as multiple words in a line, slowing down or speeding up, punctuation display, special characters, special icons, and so on. If it is not a special operation command, control proceeds to step 614 where the text is displayed in the RSVP window at the selected speed. After either step 612 or step 614, control proceeds to step 616 to determine if a user input has been received. Preferably the control buttons 206 include various command keys to slow down, speed up or pause the display. Alternatively, a control button 206 can go to a menu to provide further options. Also the control buttons 206 can be utilized to scan through titles and headings contained on the marked-up file if desired, or to jump to a particular paragraph and so on, because these items are also preferably marked by special commands. If a user input has been received, then at step 618 the particular input is processed, i.e., speed up, slow down, or so on. After this input is processed, it is preferably stored in step 620 along with the related XML statement. This allows contextual information to be developed from this input to provide further commands, such as speed up or slow down, tailored for the particular user, if desired. An alternative use of a user input is to mark or highlight a section of the marked up file. This highlighting can then be saved in the marked up file as a command set and any future viewings of the marked up file will include the highlighting or other changes to the marked up file. If there was no user input or after storage in step 620, control proceeds to step 622 to determine if the display of the file has been completed. If not, control returns to step 608 where the next XML statement is interpreted. If complete, control proceeds to step 624 where the stored inputs are provided to the backend system 106 for further control and inclusion into a user profile. In step 626 the operation ends. Again, it is noted that this is a very simple flowchart for explanatory purposes and in actual operation this would be done using a series of multi-tasking threads and programs.

It is also been determined that by providing an audio assist to the RSVP display, user comprehension is increased. To perform this operation, an additional module is provided in the mobile device 100, namely a text to speech module. The text to speech module operates in parallel with or as a part of the display text in the window step 614, so that as the text is displayed the text to speech module provides the sound of the particular word. It has been determined that this improves comprehension, particularly when a user blinks or is otherwise distracted from concentrating on the RSVP window 208.

An alternative audio assist is to provide audio cues or other audio non-verbal indications as desired. For example, instead of slowing down or pausing the display, an audio tone or sound could be used. As a detailed example, a chime could be directed to be played at the start of a paragraph by a command, instead of a pause, color change or special character display.

It has been discussed above that preferably text files are utilized in this process but it is also possible for HTML files to be utilized as well, with a proper translator or E-mail, which is a text file, with an interface into the user's E-mail system.

In addition, as many mobile devices, particularly mobile phones, include rudimentary voice recognition, in addition to using the control buttons 206, it is also possible for the mobile device 100 to receive spoken input to perform any of the operations indicated and described above for any of the control buttons 206.

A series of enhancements to RSVP have been described above, but it is understood that many more enhancements are possible and could be included in the marked-up file by the inclusion of the appropriate commands and then properly performed by the mobile device.

While this description has focused on having the backend system 106 separate from the mobile device 100, either as a standalone device or combined with the user computer 116, it is also understood that these functions could be performed in the mobile device 100, particularly in the future as processing and storage capabilities in the mobile device 100 increase. In such an instance the parsing and embedding of commands can be done in real time with the display of the text or it can be done in the background as a separate task.

While the primary mobile devices described above have been mobile phones and PDAs, it is understood that many other devices, such as watches, pagers and the like, each potentially with their own communication network, can equally use the described techniques and thus are to be considered mobile devices. The PDA described above is one example of a wired device, but it is understood that other wired devices could also be used, including devices such as televisions which are not mobile.

While illustrative embodiments of the invention have been illustrated and described, it will be appreciated that various changes can be made therein without departing from the spirit and scope of the invention.

The invention claimed is:

1. A system for presenting textual information on a small display of a mobile device, the system comprising:
   a backend system including:
   a backend communication interface;
   a text file receiver coupled to said backend communication interface to receive text files;
   file storage coupled to said text file receiver to store received files;
   a markup language formatter coupled to said file storage to retrieve a received text file, to convert said retrieved text file into a markup language file, and to store said markup language file; and
   a file transmitter coupled to said file storage and said backend communication interface to transmit markup language files; and
   a mobile device coupled to said backend system, the mobile device including:
   a mobile communication interface;
   a small display;
   a file receiver coupled to said mobile communication interface to receive markup language files; and
   a rapid serial visual presentation (RSVP) unit coupled to said small display and said file receiver to display a received markup language file on said small display in an RSVP format in an RSVP text location and as directed by said received markup language file,
   wherein said markup language formatter embeds commands relating to characteristics of the RSVP format display based on the contents of said retrieved text file, and
   wherein said RSVP unit interprets commands in said received markup language file and appropriately changes the characteristics of the RSVP format display.

2. The system of claim 1, further comprising:
   a user computer coupled to said backend system, the user computer including:
   a user communication interface; and
   a user interface, and
   wherein said backend system further includes a backend interface coupled to said backend communication interface to interface with said user interface to allow a user to select an individual text file to be received by said backend system.

3. The system of claim 2, wherein said user interface is a browser and said backend interface is a Web server.

4. The system of claim 2, wherein said backend system and said user computer are on a common computer system and wherein said mobile device is a separate device from said common computer system.

5. The system of claim 1, further comprising:
   a user computer coupled to said backend system and said mobile device, the user computer including:
   a user to backend communication interface for received markup language files;
   a user to mobile device communication interface for transmitting received markup language files;
   a transfer module to transfer markup language files from said user to backend communication interface to said user to mobile device communication interface.

6. The system of claim 5, wherein said backend system and said user computer are on a common computer system and wherein said mobile device is a separate device from said common computer system.

7. The system of claim 5, wherein said mobile device is a personal data assistant (PDA).

8. The system of claim 1, wherein said mobile device is a mobile phone.

9. The system of claim 1, wherein said backend system further includes a backend interface coupled to said backend communication interface to allow a user to personalize the backend system.

10. The system of claim 9, wherein said mobile device includes a user interface and a user communication interface to interface with said backend interface.

11. The system of claim 1, wherein said command is selected from the group consisting of:
   to pause and is provided after a punctuation mark;
   to pause and is provided after the end of a paragraph;
   to perform an operation on a long word;
   to display multiple short words together;
   to format the word to be displayed;
   to indicate the beginning of a quotation and wherein said mobile device displays a special character to indicate a quotation;
   to indicate the beginning of a parenthetical expression and wherein said mobile device displays a special character to indicate a parenthetical expression;
   to display the following text items as a list;
   to indicate the next word is a paragraph start and wherein said mobile device displays a special character;
   to display the following word as a hypertext link;
   to display the following words in a table format;
   to indicate the following word is a heading;
   to slow down due to a pattern change in the text;
   to slow down to display a following number; and
   to display a following proper name.

12. The system of claim 11, wherein said operation on a long word is selected from the group consisting of:
   to slow down during presentation of the long word;
   to clip off leading and trailing characters of the long word;
   to compress the long word by removing selected portions;
   to display the long word in a smaller font; and
   to hyphenate the long word.

13. The system of claim 1, wherein the text to be displayed is two items related to each other and the second of said items is a value which may vary over time, wherein said command is a command to indicate the next words are such two related items, and wherein said mobile device displays said related items together.

14. The system of claim 1, wherein said mobile device further includes a speaker and a text to speech converter having an audio output, and wherein said mobile device performs a text to speech conversion on the word being displayed and provides the audio output to said speaker synchronously with displaying the word.

15. A system for providing a marked up file of textual information for display on a small display of a mobile device using rapid serial visual presentation (RSVP) format in an RSVP text location, the system comprising:
   a backend communication interface;
   a text file receiver coupled to said backend communication interface to receive text files;
   file storage coupled to said text file receiver to store received files;
   a markup language formatter coupled to said file storage to retrieve a received text file, to convert said retrieved text file into a markup language file, and to store said markup language file; and
   a file transmitter coupled to said file storage and said backend communication interface to transmit markup language files,
   wherein said markup language formatter embeds commands relating to characteristics of the RSVP format display based on the contents of said retrieved text file.

16. The system of claim 15, wherein the mobile device is a mobile phone.

17. The system of claim 15, wherein said system further includes a backend interface coupled to said backend communication interface to allow a user to personalize the backend system.

18. The system of claim 15, wherein said command is selected from the group consisting of:
   to pause and is provided after a punctuation mark;
   to pause and is provided after the end of a paragraph;
   to perform an operation on a long word;
   to display multiple short words together;
   to format the word to be displayed;
   to indicate the beginning of a quotation;
   to indicate the beginning of a parenthetical expression;
   to display the following text items as a list;
   to indicate the next word is a paragraph start;
   to display the following word as a hypertext link;
   to display the following words in a table format;
   to indicate the following word is a heading;
   to slow down due to a pattern change in the text;
   to slow down to display a following number; and
   to display a following proper name.

19. The system of claim 18, wherein said operation on a long word is selected from the group consisting of:
   to slow down during presentation of the long word;
   to clip off leading and trailing characters of the long word;
   to compress the long word by removing selected portions;
   to display the long word in a smaller font; and
   to hyphenate the long word.

20. The system of claim 15, wherein the text to be displayed is two items related to each other and the second of said items is a value which may vary over time and wherein said command is a command to indicate the next words are such two related items.

21. A method for presenting textual information on a display of a device, the method comprising:
   receiving a text file;
   storing said received file;
   retrieving said received text file;
   converting said retrieved text file into a markup language file;
   storing said markup language file;
   transmitting said markup language file;
   receiving said transmitted markup language file; and
   displaying said received markup language file on the display in a rapid serial visual presentation (RSVP) format in an RSVP text location and as directed by said received markup language file,
   wherein said conversion to a markup language files includes embedding commands relating to characteristics of the RSVP format display based on the contents of said retrieved text file, and
   wherein displaying said received markup language file includes interpreting commands in said received markup language file and appropriately changing the characteristics of the RSVP format display.

22. The method of claim 21, further comprising:
   providing an interface to allow a user to select an individual text file for conversion.

23. The method of claim 21, further comprising:
   allowing a user to personalize the operations.

24. The method of claim 21, wherein said command is selected from the group consisting of:
   pausing and is provided after a punctuation mark;
   pausing and is provided after the end of a paragraph;
   performing an operation on a long word;
   displaying multiple short words together;
   formatting the word to be displayed;
   indicating the beginning of a quotation and wherein the device displays a special character to indicate a quotation;
   indicating the beginning of a parenthetical expression and wherein the device displays a special character to indicate a parenthetical expression;
   displaying the following text items as a list;
   indicating the next word is a paragraph start and wherein the device displays a special character;
   displaying the following word as a hypertext link;
   displaying the following words in a table format;
   indicating the following word is a heading;
   slowing down due to a pattern change in the text;
   slowing down to display a following number; and
   displaying a following proper name.

25. The method of claim 24, wherein said operation on a long word is selected from the group consisting of:
   slowing down during presentation of the long word;
   clipping off leading and trailing characters of the long word;
   compressing the long word by removing selected portions;
   displaying the long word in a smaller font; and
   hyphenating the long word.

26. The method of claim 21, wherein the text to be displayed is two items related to each other and the second of said items is a value which may vary over time, wherein said command is a command to indicate the next words are such two related items, and wherein the device displays said related items together.

27. The method of claim 21, further comprising:
   performing a text to speech conversion on the word being displayed; and providing the audio output to a speaker synchronously with displaying the word.

28. A method for presenting textual information on a display of a device, the method comprising:
receiving a text file;
storing said received file;
retrieving said received text file;
converting said retrieved text file into a markup language file;
storing said markup language file; and
transmitting said markup language file,
wherein said conversion to a markup language files includes embedding commands relating to characteristics of the RSVP format display based on the contents of said retrieved text file.

29. The method of claim 28, wherein said command is selected from the group consisting of:
pausing and is provided after a punctuation mark;
pausing and is provided after the end of a paragraph;
performing an operation on a long word;
displaying multiple short words together;
formatting the word to be displayed;
indicating the beginning of a quotation and wherein the device displays a special character to indicate a quotation;
indicating the beginning of a parenthetical expression and wherein the device displays a special character to indicate a parenthetical expression;
displaying the following text items as a list;
indicating the next word is a paragraph start and wherein the device displays a special character;
displaying the following word as a hypertext link;
displaying the following words in a table format;
indicating the following word is a heading;
slowing down due to a pattern change in the text;
slowing down to display a following number; and
displaying a following proper name.

30. The method of claim 29, wherein said operation on a long word is selected from the group consisting of:
slowing down during presentation of the long word;
clipping off leading and trailing characters of the long word;
compressing the long word by removing selected portions;
displaying the long word in a smaller font; and
hyphenating the long word.

31. The method of claim 28, wherein the text to be displayed is two items related to each other and the second of said items is a value which may vary over time, wherein said command is a command to indicate the next words are such two related items, and wherein the device displays said related items together.

32. A non-transitory computer-readable storage medium storing programs for permitting computers to perform a method for presenting textual information on a display of a device, the method comprising:
receiving a text file;
storing said received file;
retrieving said received text file;
converting said retrieved text file into a markup language file;
storing said markup language file;
transmitting said markup language file;
receiving said transmitted markup language file; and
displaying said received markup language file on the display in a rapid serial visual presentation (RSVP) format in an RSVP text location and as directed by said received markup language file,
wherein said conversion to a markup language files includes embedding commands relating to characteristics of the RSVP format display based on the contents of said retrieved text file, and
wherein displaying said received markup language file includes interpreting commands in said received markup language file and appropriately changing the characteristics of the RSVP format display.

33. The non-transitory computer-readable storage medium of claim 32, the method further comprising:
providing an interface to allow a user to select an individual text file for conversion.

34. The non-transitory computer-readable storage medium of claim 32, the method further comprising:
allowing a user to personalize the operations.

35. The non-transitory computer-readable storage medium of claim 32, wherein said command is selected from the group consisting of:
pausing and is provided after a punctuation mark;
pausing and is provided after the end of a paragraph;
performing an operation on a long word;
displaying multiple short words together;
formatting the word to be displayed;
indicating the beginning of a quotation and wherein the device displays a special character to indicate a quotation;
indicating the beginning of a parenthetical expression and wherein the device displays a special character to indicate a parenthetical expression;
displaying the following text items as a list;
indicating the next word is a paragraph start and wherein the device displays a special character;
displaying the following word as a hypertext link;
displaying the following words in a table format;
indicating the following word is a heading;
slowing down due to a pattern change in the text;
slowing down to display a following number; and
displaying a following proper name.

36. The non-transitory computer-readable storage medium of claim 35, wherein said operation on a long word is selected from the group consisting of:
slowing down during presentation of the long word;
clipping off leading and trailing characters of the long word;
compressing the long word by removing selected portions;
displaying the long word in a smaller font; and
hyphenating the long word.

37. The non-transitory computer-readable storage medium of claim 32, wherein the text to be displayed is two items related to each other and the second of said items is a value which may vary over time, wherein said command is a command to indicate the next words are such two related items, and wherein the device displays said related items together.

38. The non-transitory computer-readable storage medium of claim 32, the method further comprising:
performing a text to speech conversion on the word being displayed; and
providing the audio output to a speaker synchronously with displaying the word.

39. A non-transitory computer-readable storage medium storing programs for permitting computers to perform a method for presenting textual information on a display of a device, the method comprising:
receiving a text file;
storing said received file;
retrieving said received text file;

converting said retrieved text file into a markup language file;

storing said markup language file; and transmitting said markup language file, wherein said conversion to a markup language files includes embedding commands relating to characteristics of the RSVP format display based on the contents of said retrieved text file.

40. The non-transitory computer-readable storage medium of claim 39, wherein said command is selected from the group consisting of:

pausing and is provided after a punctuation mark;
pausing and is provided after the end of a paragraph;
performing an operation on a long word;
displaying multiple short words together;
formatting the word to be displayed;
indicating the beginning of a quotation and wherein the device displays a special character to indicate a quotation;
indicating the beginning of a parenthetical expression and wherein the device displays a special character to indicate a parenthetical expression;
displaying the following text items as a list;
indicating the next word is a paragraph start and wherein the device displays a special character;
displaying the following word as a hypertext link;
displaying the following words in a table format;
indicating the following word is a heading;
slowing down due to a pattern change in the text;
slowing down to display a following number; and
displaying a following proper name.

41. The non-transitory computer-readable storage medium of claim 40, wherein said operation on a long word is selected from the group consisting of:

slowing down during presentation of the long word;
clipping off leading and trailing characters of the long word;
compressing the long word by removing selected portions;
displaying the long word in a smaller font; and
hyphenating the long word.

42. The non-transitory computer-readable storage medium of claim 39, wherein the text to be displayed is two items related to each other and the second of said items is a value which may vary over time, wherein said command is a command to indicate the next words are such two related items, and wherein the device displays said related items together.

* * * * *